United States Patent [19]
Buckingham et al.

[11] 3,798,458
[45] Mar. 19, 1974

[54] OPTICAL SCANNER INCLUDING AN APERTURE DESIGN FOR NON-SYNCHRONOUS DETECTION OF BAR CODES

[75] Inventors: Robert L. Buckingham, Hawthorne; Jonathan B. Davis, Mahopac; Harold H. Herd, Pawling, all of N.Y.

[73] Assignee: International Business Machines Corporation, Armonk, N.Y.

[22] Filed: Oct. 30, 1972

[21] Appl. No.: 301,917

[52] U.S. Cl. 250/569, 250/237, 235/61.11 E, 340/146.3 G
[51] Int. Cl. G01n 21/30
[58] Field of Search... 250/221, 230, 219 DC, 219 D; 235/61.11 E, 61.11 F; 340/146.3 G, 146.3 Z

[56] References Cited

UNITED STATES PATENTS

| | | | |
|---|---|---|---|
| 2,224,646 | 12/1940 | Friedman et al. | 250/61.11 E |
| 2,362,004 | 11/1944 | Heidinger | 250/61.11 E |
| 3,229,075 | 1/1966 | Palti | 250/237 R |
| 3,699,312 | 10/1972 | Jones et al. | 250/219 D |
| 3,238,501 | 3/1966 | Mak et al. | 235/61.11 E |
| 3,351,765 | 11/1967 | Malone et al. | 250/219 D |
| 3,519,833 | 7/1970 | Arch et al. | 250/21 DD |
| 3,526,777 | 9/1970 | Robinson | 250/237 R |

*Primary Examiner*—James W. Lawrence
*Assistant Examiner*—Harold A. Dixon
*Attorney, Agent, or Firm*—John J. Goodwin and John J. Goodwin, II

[57] ABSTRACT

What is disclosed is an optical scanner for reading bar codes. The scanner is designed to be held by hand and moved above and across the bar code which is printed on a suitable record substrate. The scanner is composed of a suitable casing containing lamps in the lower portion thereof which illuminate the bar coded record. The illumination is reflected through a unique aperture in the lower surface of the scanner and directed onto a light sensor arrangement such as a photocell. The code marks are in the form of code bars such as black lines separated by white portions. The code consists of "single" code bars and "double" code bars which are, in one embodiment, twice the width of the "single" bars. The aperture arrangement of the scanner is designed according to a scheme such that the resultant signal from the detection of a single bar will always be a known fraction, such as one-half, the amplitude of the signal produced by the detection of a double bar regardless of the changes in speed at which the hand-held scanner is moved across the bar coded record.

11 Claims, 5 Drawing Figures

OPTICAL SCANNER INCLUDING AN APERTURE DESIGN FOR NON-SYNCHRONOUS DETECTION OF BAR CODES

BACKGROUND OF THE INVENTION

1. Field of the Invention

The present invention relates to optical scanners and more particularly to hand-held optical scanners for reading bar codes.

2. Prior Art

U.S. Pat. No. 3,217,294 issued Nov. 9, 1965 to R. K. Gerlach et al. and assigned to the National Cash Register Company and U.S. Pat. No. 3,243,776 issued Mar. 29, 1966 to T. C. Abbott, Jr. et al. and also assigned to the National Cash Register Company both show reading devices having diamond shaped apertures. U.S. Pat. No. 3,351,765 issued to Malone et al. shows a plurality of elliptical apertures and U.S. Pat. No. 3,229,075 shows a reading device having several styles of apertures.

None of the prior art references cited relate to hand-held scanners having apertures designed according to principles which render the scanner independent of synchronism when scanning bar codes.

SUMMARY OF THE INVENTION

An object of the present invention is to provide an optical scanner which can be moved across and detect a bar code.

Another object of the present invention is to provide an optical scanner for detecting bar codes independent of the rate of speed at which the scanner is moved across the code marks.

A further object of the present invention is to provide an optical scanner for bar codes having apertures designed to have dimensions to produce dissipation functions such that the signal amplitude produced by the detection of a single mark is one-half that produced by the detection of a double mark.

The foregoing and other objects, features and advantages of the invention will be apparent from the following more particular description of the preferred embodiment of the invention, as illustrated in the accompanying drawings.

BRIEF DESCRIPTION OF THE DRAWINGS

In the drawings:

FIG. 4 also illustrates how different aperture geometries may be employed.

DESCRIPTION OF THE PREFERRED EMBODIMENT

The present invention relates to an optical scanner designed to be held in the hand of a human operator and moved across a record containing information in the form of a bar code. The differences in the dark and light portions of the bar code are detected by a photosensitive element in the scanner which converts the optical signals to electrical signals which may then be recorded or processed, for example, in a computer.

Figure 1:
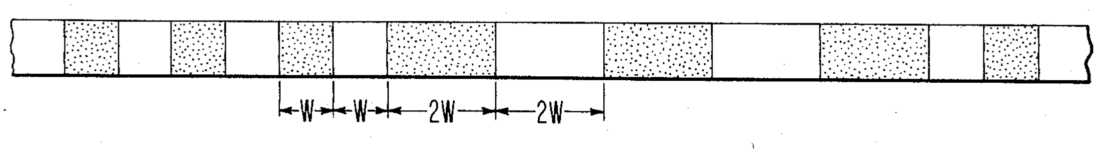
FIG. 1 is an example of a typical bar code which may be scanned and detected with one embodiment of the present invention.

FIG. 1 illustrates an example of a typical bar code including "singles" and "doubles" wherein the "doubles" are twice the width of the "singles." Detection of a single may indicate a binary 0 and detection of a double may indicate a binary 1. The code shown in FIG. 1 is just one example of a bar code, and for other applications it may be more desirable to employ singles and triples or other such combinations.

In synchronous optical reading systems of the type wherein the bar code record is transported at a uniform rate of speed beneath a stationary optical reading head, or conversely wherein an optical reading head is transported uniformly by mechanical means over a stationary bar code record, detection is no problem because the detection time period for a singles bar will be one-half the time period of that of the detection of the doubles bar as a result of the constant scan rate.

In the case of a hand-held scanner, that is a scanner which is moved across the bar code record by a human operator, it is most probable that the scanner will not be transported across the coded record at a constant scan rate. The result is that the output signals will not be constant for the detection of the separate bars. To use an extreme case as an example, if the operator took twice the time to pass the scanner over a "single" as he did for a "double," the resultant output signals for both bars would be detected as doubles.

In the present invention, the aperture of the hand-held scanner is dimensionally designed according to unique principles such that signals produced by "doubles" will have twice the amplitude of signals produced by "singles" and the differences between the signals (i.e., the difference between a "single" and a "double" can be determined by passing the output from the scanner through a threshold detector.

The present invention employs the principle of convolution to obtain the desired results of non-synchronous code detection. In general, in the scanner system of the present invention, the signals produced by the scanner are based on the convolution of the aperture transmission function (i.e., the illumination passed through the aperture to the sensor) and the coded information emission function (i.e., the light reflected from the coded record through the aperture).

Figure 2:
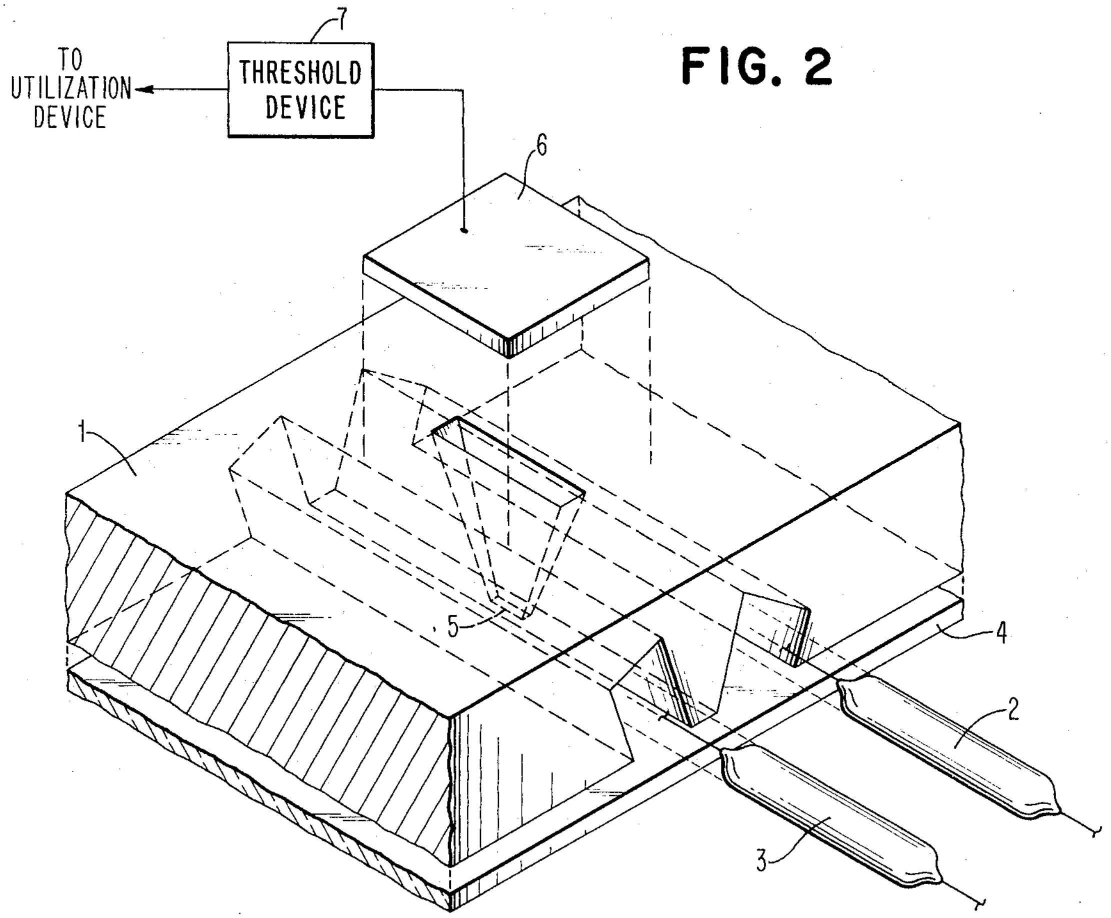
FIG. 2 is an illustration of one embodiment of a hand-held scanner for reading bar codes of the type shown in FIG. 1.

FIG. 2 shows an exploded view of an embodiment of a hand-held scanner according to the principles of the present invention. The scanner consists of a support block 1 having recesses in the lower portion thereof in order to contain a pair of illuminating sources such as pin lights 2 and 3. The light is directed downward through a glass bottom plate 4 to illuminate the bar code record. The light is reflected from the bar code record and therefore contains information content.

The reflected light passes through an aperture 5 and is directed upward to a light sensitive element 6, such as a silicon cell, which converts the optical information into electrical signals which are conducted by wires to a utilization device through a threshold detection device 7.

As previously stated, the present invention is based on the principle of convolution. Convolution may be described simply by the following example with reference to FIG. 3. Assume a sensing element, such as element 6 in FIG. 2, with a width $W_s$, an aperture such as aperture 5 in FIG. 2, with a width $W_a$, and an information area containing a bar code located with respect to the aperture as shown. Assuming that the information area is illuminated, it is obvious that light energy radiating from any point within the area defined by $W_i$ will be detected by the sensor. Assume that within the area $W_i$ there exists an information element (i.e., a bar code indicia) having dimensions $W_e$ which are smaller than $W_i$. Because of this ratio, $W_e$ being smaller than $W_i$, the bar code element information contributes only a small amount to the signal detected by the sensor. In order to increase the signal represented by $W_e$, it is necessary to decrease the ratio $W_i/W_e$. This can be accomplished by altering any one or all of the physical dimensions set forth in FIG. 3.

The fact that $W_i$ is greater than $W_e$ is the reason for the condition which is known as convolution. That is, at any given point, the sensor is responding to the total energy represented by all information elements contained in the area $W_i$. Hence, the contribution of any one information element is diminished. Decreasing the ratio $W_i/W_e$ effectively decreases the convolution effect. However, there is a practical limit imposed on the physical dimensions that may be achieved in the scanner and on the sensitivity of the sensor. Thus, it is impossible to eliminate the convolution effect entirely.

In the present invention, however, the ever-present convolution effect is used to advantage. It is obvious that if $W_i$ is less than $W_e$ in FIG. 3, the information element being scanned will be responsible for the entire signal produced by the scanner. However, if $W_i$ is greater than $W_e$, the signal represented by the information element will be a fraction of the total signal. In the present invention, the object is to separate two different information elements according to the amplitude of the signal generated when they, the different information elements of the bar code, are presented to the aperture during the scanning operation. As previously stated, the particular embodiment described is employed with a bar code having information widths in the ratio of two-to-one.

Figure 3:
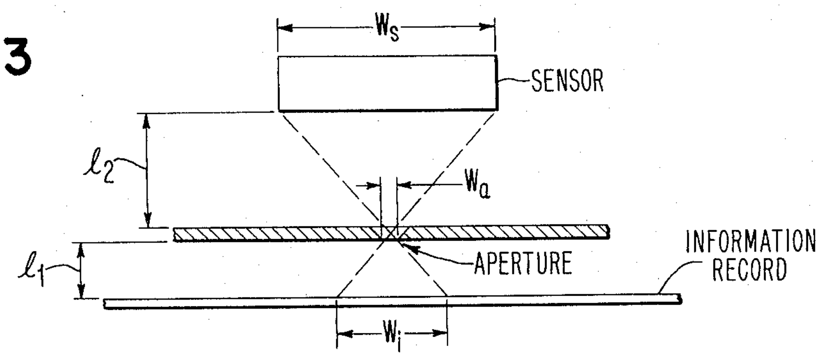
FIG. 3 is a schematic diagram showing the relationship between the bar code record, the scanner aperture and the scanner optical sensor to aid in the explanation of the principles of the aperture design which permits the scanner of the present invention to be independent of synchronous movement.

Naturally, physical constraints dictate that in FIG. 3 the dimensions $l_1$ (the distance between the aperture and the bar code record) and $l_2$ (the distance between the aperture and the sensing element) be greater than zero. Thus, the convolution effect depends on all the physical dimensions and not merely on $W_a$. The dimension $W_s$ may be, as in the present embodiment, the actual dimension of the sensing element, however, $W_s$ may also be a portion of the sensing element exposed by locating a second aperture between the original aperture and the sensing element. For purposes of explanation, the term "slit width" is defined as the width $W_i$ actually "seen" by the sensing element.

It will be assumed for purposes of explanation, that the sensing element has uniform sensitivity over the entire area $W_s$ and, therefore, only the physical dimensions contribute to the convolution. Sensors having uniform sensitivity over their entire area are presently available.

It is a principle of the present invention that apertures of different geometric shapes, such as rectangular, circular, elliptical, trapezoidal, etc., can be employed depending on the characteristics of the information to be sensed provided that the physical shape and dimensions of such apertures give rise to a convolution function that processes the input signal in the desired fashion, as will now be described.

A teaching of the manner in which the scanner aperture is determined in order to realize the objects of the present invention is provided by way of the following example.

The calculation of contrast is defined by the formula contrast = maximum signal − minimum signal/maximum signal + minimum signal Contrast is defined as the amount of change of intensity of a given signal with respect to the maximums and minimums which can be read. The analogy to contrast in electronic communication is modulation.

The signal to be measured in the present example is a series of black bars of widths W and 2W separated by white spaces of widths W and 2W, suitably intermixed in accordance with the coding scheme and as illustrated in FIG. 1. If the scanning slit width (i.e., $W_1$) is less than or equal to W, there will be no amplitude discrimination between black bars and white spaces of either width W or 2W because the area of the slit width is less than the area of the smallest mark W. Therefore, the contrast will always be unity. If the scanning slit width $W_i$ is less than or equal to 2W but greater than W, the contrast will be unity for all bars and spaces of width 2W, but less than unity for the smaller bars and spaces.

In the present invention, where the width of a single mark is W, the area of the scanning slit $W_i$ must be greater than W but less than 2W to achieve the desired result otherwise there will be no difference in contrast between W and 2W. The amount of slit width $W_i$ in excess of a single mark width is denoted by the fraction $a$ which is a fraction less than unity of the single mark width W.

Under these conditions, the slit width $W_i$ will "see" a white width W + aW when scanning a double white but will "see" zero on a double black width; hence $$\text{contrast} = (W + a\text{W} - 0/W + a\text{W} + 0) = 1$$

When scanning "singles", the slit width $W_i$ will see an area B directly related to single code width W when passing over a single white because the extra area represented by the fraction $a$B will be black. When passing over a single black, the slit width $W_i$ will see an area directly related to the black width W but the fraction $a$B will be white; hence $$\text{contrast} = B - a\text{B}/B + a\text{B} = B(1 - a)/B(1 + a) = 1 - a/1 + a$$

Using the teachings explained thus far, one skilled in the art can determine the fraction for a desired contrast. For example, if a contrast of one-half is desired, the fraction is determined as follows:

$\frac{1}{2} = (1 - a/1 + a)$ then $1 + a/2 = 1 - a$ then
$\frac{1}{2} + a/2 = 1 - a$ then
$a/2 + a = 1 - \frac{1}{2}$ then
$3a/2 = \frac{1}{2}$ and $a = \frac{1}{3}$ Thus, for a contrast of one-half, the dimensions of $W_t$ are designed to be equal to $B + \frac{1}{3}B$, that is, the area within the single bar of the code plus one-third of the area within the single width. The aperture size for obtaining such value of $W_t$ can be obtained by simple geometry using the parameters set forth in FIG. 3.

Figure 4:
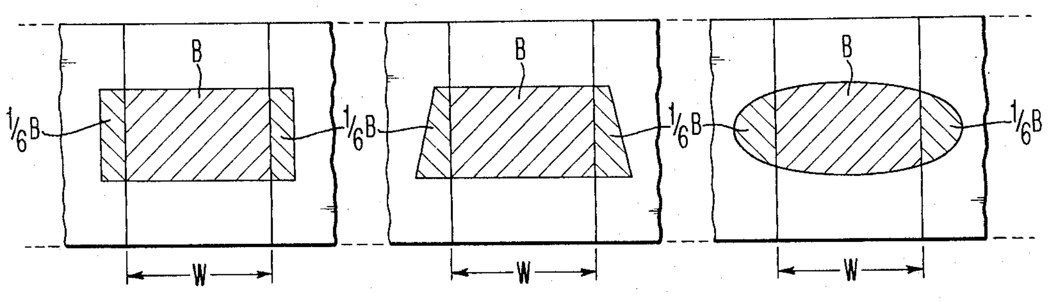
FIG. 4 illustrates the relationship between the area scanned by the scanner of the present invention and a single bar code mark to obtain a selected contrast.

FIG. 4 depicts a series of singles marks and the scanning area for producing a contrast of one-half. FIG. 4 also shows that any number of aperture geometries can be used to accomplish the same results, the specific examples being a rectangle, a trapezoid and an ellipse.

For completeness, another example will be given for a desired contrast of two-thirds.

$\frac{2}{3} = (1 - a/1 + a)$ then
$\frac{2}{3} + 2a/3 = 1 - a$ then
$5a/3 = \frac{1}{3}$ then
$a = 1/5$.

Thus, in FIG. 4, the particular apertures are designed such that the total area outside of the single code mark in each case is 1/5B. Knowing the values of B, $l_1$, $l_2$ and $W_t$ for a particular scanner, one skilled in the art can easily determine the particular area of the aperture to provide a scanning area of $B + aB$.

Figure 5:
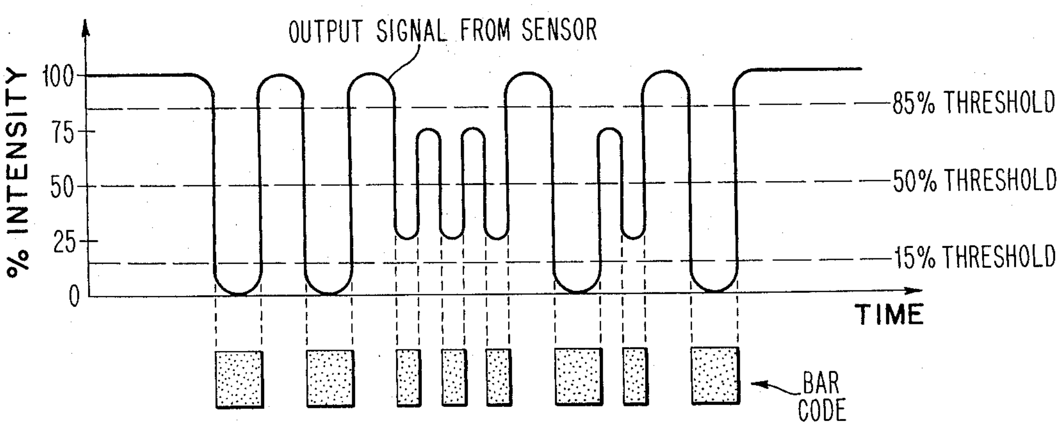
FIG. 5 illustrates by means of a scanner output waveform the theory by which the scanner of the present invention may be operated independent of synchronous movement.

It was previously stated that one of the primary advantages of the present invention is that the hand-held scanner may be passed over the bar code marks at non-constant rates and still detect singles from doubles with constant accuracy. As an example of why the scanner of the present invention can detect the separation of single and double width marks in a non-synchronous manner, reference is made to FIG. 5. FIG. 5 depicts a typical set of marks and the curve represents the resultant output signal as the scanner is moved across the code marks from left to right.

As shown in FIG. 5, when the scanner "sees" completely white areas, the output signal is at a maximum, depicted by the 100 percent point on the graph. As the scanner passes over the double black and double white areas, the signal falls to zero and then rises again to 100 percent. As the scanner passes over the single black and single white areas, the signal varies between 25 percent and 75 percent, yielding the desired contrast which, in this example, is one-half.

Three threshold detectors in threshold device 7 of FIG. 1 may be employed to separate double and single black and white marks in a manner to be described. The threshold detectors are conventional detectors for determining electrical signal levels and are available in the art, therefore, no specific circuit details for threshold device 7 will be described. The threshold detectors are set to respond to the 85 percent, 50 percent and 15 percent levels of the signal. Sensing a downward transition through the 50 percent threshold indicates the beginning of a black mark; sensing an upward transition through the 50 percent threshold indicates the end of a black mark. If the signal passes through the 15 percent threshold, the black mark was a double black. If the upward transition through the 50 percent threshold is sensed without sensing the 15 percent threshold, the black mark was a single black. A similar process applied to the 50 percent and 85 percent thresholds will separate double and single white areas between black marks.

The logical combination of the threshold signals to produce single and double mark indications is dependent only on the sequence in which the various threshold signals are received, and not on the time relationships between them; hence, the detection is non-synchronous.

What has been described is an improved hand-held scanner for reading information such as bar code marks. The scanner incorporates a class of unique apertures, the design principles of which have been described hereinabove. For a given desired contrast figure, a fraction can be derived from which the proper aperture can be designed. As a result of the unique aperture, particular signals are produced by the scanner which, when passed through a threshold device, will detect and distinguish the separate code marks regardless of variations in velocity as the scanner is passed across the information record. Thus, the human operator utilizing the scanner is not constrained to the difficult task of scanning with uniform speed. Although the invention was described with reference to bar codes consisting of single and double width marks, the invention is not limited to such embodiment and may be employed with other type of code sequences.

While the invention has been particularly shown and described with reference to a preferred embodiment thereof, it will be understood by those skilled in the art that the foregoing and other changes in form and details may be made herein without departing from the spirit and scope of the invention.

What is claimed is:

1. An optical scanner for detecting coded information marks on a record of the type wherein said scanning is effected by relative motion between said scanner and said coded information marks on said record comprising:

a support structure, an aperture in said support structure for transmitting variations in light energy reflected from said coded information marks on said record from a predetermined area of said record seen by said aperture, and light sensing means located on said support structure confronting said aperture for converting said variations in light energy transmitted through said aperture into corresponding variations in electrical energy, said coded information marks on said record being manifested as light and dark areas arranged in a coded sequence, given ones of said light and dark areas being of a width W smaller in width than the others of said light and dark areas to provide code information indicia which are distinguishable by width, and wherein the size and shape of said aperture in said support structure are selected to transmit light energy from a total predetermined area of said code record seen by said aperture, said total predetermined area of said code record being seen by said aperture, having a width *Wi* larger than said width W of said smaller light and dark areas such that said total predetermined area is larger than the area of the smaller code indicia seen by said aperture by a predetermined fraction a having a value less than unity of the area B of the smaller code indicia seen by said aperture so that the total area seen by said aperture is equal to the sum of B plus the product $a$B.

2. An optical scanner for detecting coded information marks on a record according to claim 1 including a light source means mounted in said support structure for illuminating said coded information marks.

3. An optical scanner for detecting coded information marks on a record according to claim 2 wherein said light source means comprises recesses in the lower portion of said support structure containing a pair of elongated sources of illumination.

4. An optical scanner for detecting coded information marks on a record according to claim 3 wherein said support structure includes a glass bottom plate below said recesses, and said aperture.

5. An optical scanner for detecting coded information marks on a record according to claim 4 wherein said light sensing means comprises a silicon cell.

6. An optical scanner for detecting coded information marks on a record according to claim 4 wherein said light sensing means is connected to a threshold detection device.

7. An optical scanner for detecting coded information marks on a record according to claim 1 wherein said fraction $a$ is determined by the desired contrast of the optical energy to be detected in accordance with the relationship:

$$\text{desired contrast} = (B-aB/B+aB) = (1-a/1+a)$$

which transposes to $$a = 1 - \text{contrast}/1 + \text{contrast}$$

such that for a desired contrast the fraction $a$ can be calculated and for a code indicia of width W the area B and consequently the area B+aB, which is the total area to be seen by said aperture can be determined.

8. An optical scanner for detecting coded information marks according to claim 1 further including a threshold detection device connected to the output of said light sensing means and including means for detecting between separate levels of said electrical energy from said light sensing means.

9. A method of sensing variable area code indicia having plural standard sizes including scanning said code indicia with respect to an aperture filter having an opening greater than the smallest size of said indicia and less than the greatest size of said indicia, sensing the illumination passing from said scanned code as a function of time, providing a plurality of signal level peaks and valleys, and comparing amplitude levels of signals produced to distinguish between relative sizes of code indicia on an individual basis.

10. A method in accordance with claim 9 wherein said scanning of the indicia is performed by moving filter means for filtering light and sensing means for sensing across the surface of means for bearing said code indicia, whereby scanning of numerous indicia can be performed by manually addressing said filter means and sensing means to scan indicia intended to be measured.

11. In sensing of bar code indicia having a pair of standard widths including narrow and wide bar code indicia the method comprising scanning said bar code indicia with respect to a slit type of optical filter having a width greater than the width W of the narrow bar code indicia and narrower than the width of said wide bar code indicia, sensing the illumination passing from said scanned and filtered bar code indicia as a function of time to provide an output signal having plural peaks and valleys, and comparing amplitude levels of signals produced to distinguish between relative widths of bar code indicia on an individual basis.

* * * * *